Oct. 19, 1937.   E. E. HEWITT   2,096,491
FLUID PRESSURE VALVE DEVICE
Filed Aug. 17, 1934   2 Sheets-Sheet 1

INVENTOR
ELLIS E. HEWITT
BY Wm. H. Cady
ATTORNEY

Oct. 19, 1937.  E. E. HEWITT  2,096,491

FLUID PRESSURE VALVE DEVICE

Filed Aug. 17, 1934  2 Sheets—Sheet 2

INVENTOR
ELLIS E. HEWITT
BY
Wm. M. Cady
ATTORNEY

Patented Oct. 19, 1937

2,096,491

UNITED STATES PATENT OFFICE 2,096,491

FLUID PRESSURE VALVE DEVICE

Ellis E. Hewitt, Edgewood, Pa., assignor to The Westinghouse Air Brake Company, Wilmerding, Pa., a corporation of Pennsylvania Application August 17, 1934, Serial No. 740,202

36 Claims. (Cl. 303—28)

This invention relates to control valve devices for use in controlling fluid pressure controlled apparatus, and has particular reference to a relay valve device for use in fluid pressure brake equipment.

One object of the invention is to provide a relay valve device which acts very quickly in response to slight changes in pressure differentials for controlling the supply of fluid under pressure to and the release of fluid under pressure from a pressure chamber and a connected fluid pressure controlled device, such, for instance, as the brake cylinder of a fluid pressure brake equipment.

A feature which contributes materially to the attainment of this object consists in so constructing and arranging the several working parts of the relay valve device that they will have a short range of travel in their controlling movements.

Another object of the invention is to provide a relay valve device having a fluid pressure supply valve mechanism, a separate exhaust valve mechanism and a pressure responsive mechanism for controlling the operation of both valve mechanisms. Another feature resides in the provision of means whereby the resistance of the supply valve mechanism to movement to its fluid supplying position is reduced upon the initial movement of the pressure responsive mechanism by fluid under pressure supplied to said pressure responsive mechanism, and a further feature resides in the provision of means whereby the resistance of the exhaust valve mechanism to movement to its fluid exhausting position is reduced upon the initial movement of the pressure responsive mechanism when a reduction is effected in the pressure of fluid acting on said pressure responsive mechanism, both of which features also contribute materially to the quick action of the relay valve device. A further feature consists in the provision of means for so adjusting the pressure responsive mechanism to the supply and exhaust valve mechanisms as to compensate for wear or unavoidable manufacturing inaccuracies in the several parts of the valve device, and a still further feature consists in the provision of an opening in the casing of the valve device through which the adjusting means is accessible for adjustment from the exterior of the valve device when the device is separated from a pipe bracket to which it is adapted to be secured, which opening is adapted to be closed by the pipe bracket when the casing is secured to the bracket, so as to prevent the adjusting means from being tampered with by an unauthorized person.

Other objects and advantages of the arrangement and construction of the several parts of the relay valve device will appear in the following more detailed description.

In the accompanying drawings, Fig. 1 is a diagrammatic view, mainly in section, of a brake equipment embodying a relay valve device constructed in accordance with the invention. In this view the valve device is for the most part shown as actually constructed, but where the parts and connections could not be shown without complications they have been shown diagrammatically; Figs. 2, 3, and 4 are cross sectional detail views taken on the lines 2—2, 3—3 and 4—4, respectively, of Fig. 1; Fig. 5 is an end view of the piston end of the exhaust valve of the relay valve device, the cap of the casing being removed; Figs. 6 and 7 are detail cross sectional views taken on the lines 6—6 and 7—7, respectively, of Fig. 1, and Figs. 8 and 9 are side and rear elevational views, respectively, of the valve device and pipe bracket as actually constructed, portions of the pipe bracket and casing of the valve device being broken away in Fig. 8 to more clearly illustrate certain features of the relay valve device.

The present invention relates particularly to a relay valve device which is indicated by the reference character 1 in the accompanying drawings. This device may be employed in numerous types of fluid controlled equipments, but for illustrative purposes only, it has been shown embodied in a railway vehicle fluid pressure brake equipment which comprises a main reservoir 2, a pressure reservoir 3, a brake cylinder 4, a brake pipe 5, a combined brake valve and brake switch device 6, a control valve device 7, an electrically controlled supply valve device 8 and an electrically controlled exhaust valve device 9.

Figure 8:
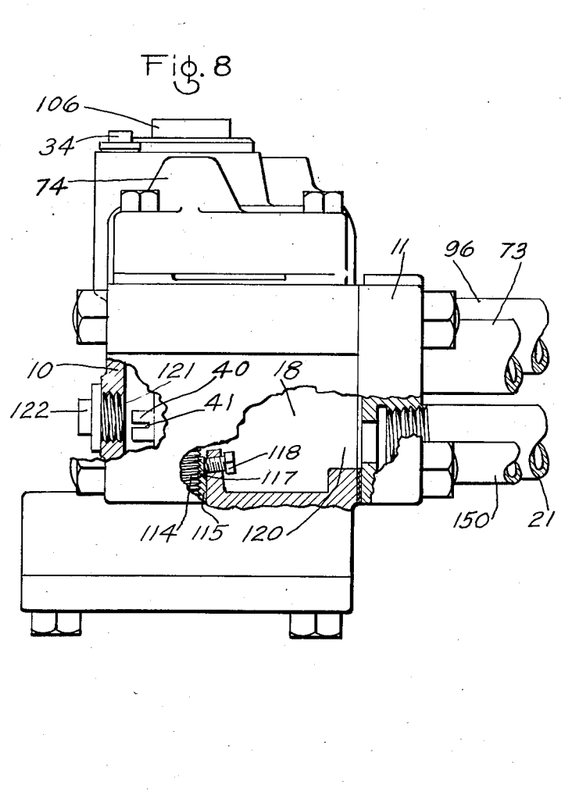
Figure 9:
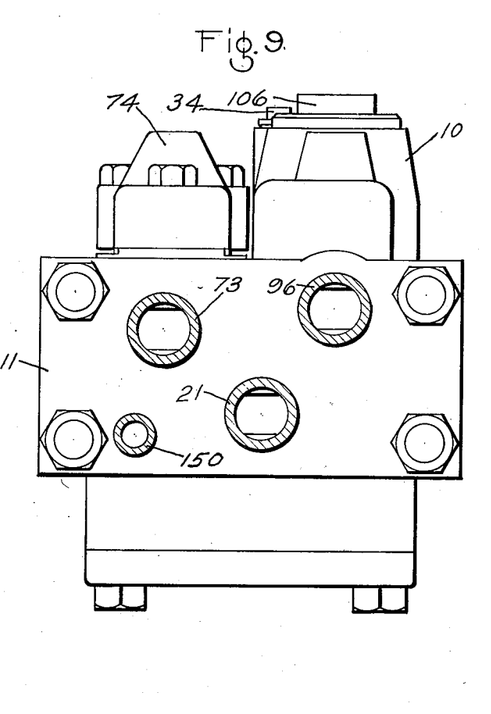

The relay valve device 1 may comprise a casing 10 which, as shown in Figs. 8 and 9, is secured to a pipe bracket 11 supported by fluid conducting pipes hereinafter mentioned or by any other suitable means.

Figures 1, 2, 3, 4, 5, 6, 7:
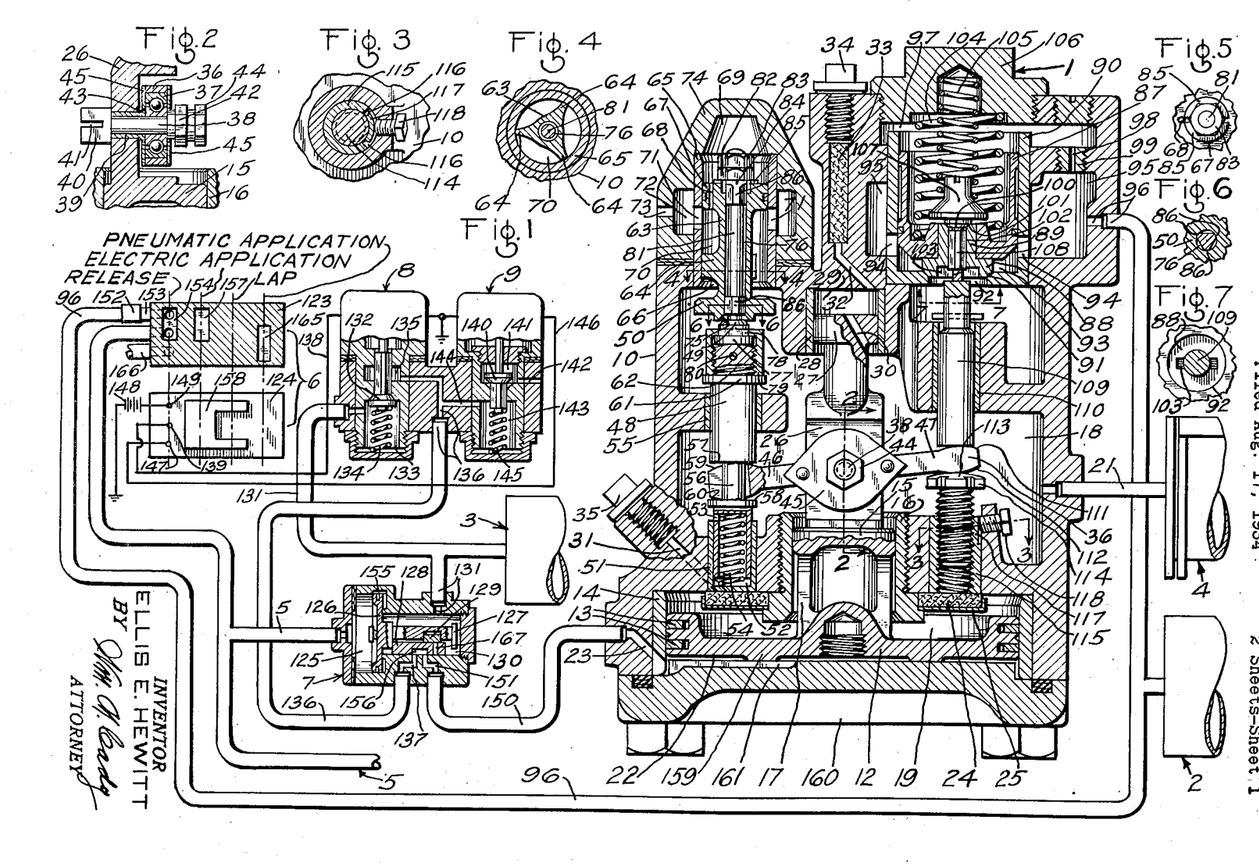

Operatively mounted in the casing 10 is a control piston 12 having piston rings 13 which slidably contact with the inner surface of a tubular bushing 14 secured to the casing and spaced away from the piston 12 is a baffle piston 15 which is of less diameter than the control piston 12 and which is adapted to be reciprocated in a tubular bushing 16 secured to the casing, said pistons being integrally connected by a stem portion 17 which, for the sake of keeping the weight of the piston assembly as light as possible, is made hollow as shown in Fig. 1.

The diameter of the inner surface of the bushing 16 is made slightly greater than the diameter of the piston 15, so as to provide an always open restricted communication between a pressure chamber 18 in the casing and a chamber 19 between the rear faces of the pistons 12 and 15, the chamber 18, in the present embodiment of the invention, being connected to the brake cylinder 4 through a passage 20 in the pipe bracket 11 and a pipe 21.

At the front side of the control piston 12 there is a piston chamber 22 connected to a passage 23 through which fluid under pressure is adapted to be supplied to and released from the chamber.

The bushing 16 for the baffle piston 15 has screw-threaded connection with the casing 10, and when screwed in place, clamps an oiling pad 24 and a metallic support 25 therefor in place within the chamber 19, the pad being maintained in contact with the casing, so that oil which may be supplied thereto, by way of a passage 31 in the casing, may creep along the casing surface which defines the inner end of the chamber 19 and along the inner surface of the bushing 14, thus lubricating the control piston 12. The passage 31 is closed to the atmosphere by a cap nut 35 which has screw-threaded connection with the casing.

Extending inwardly from the baffle piston 15 and preferably integral therewith is a piston stem 26 having a circular end portion 27 which is slidably guided in a bushing 28 screwed to the casing. One side of the guide portion 27 is open to the chamber 18 and the other side to a chamber 29 and to prevent a dash-pot action when the stem is moved inwardly by the control piston, the portion 27 is provided with a passage 30 which connects the chambers 18 and 29 and is constantly open so as to permit the free flow of fluid from either one of the chambers to the other.

Adjacent the chamber 29 the casing is provided with a bore which is connected to a passage 32 leading to the inner surface of the guide bushing 28, and contained within the bore is an oiling wick 33 of felt or other suitable material which is adapted to be soaked with lubricating oil and which is adapted to control the flow of oil through the passage 32 to the bushing surface. The bore is closed to the atmosphere by a cap nut 34 which has screw-threaded connection with the casing.

The piston stem 26 is provided intermediate the baffle piston 15 and the guide portion 27 with a rockable lever 36 which is mounted on an anti-friction bearing 37 carried by a bolt 38 mounted in a bushing 39 secured to the lever. One end of the bolt is provided with a head 40 which is provided with a groove 41 for the reception of the end of a screw driver or any other suitable tool and at the other end is provided with a nut 42 having an annular collar which clamps the inner race of the bearing 37 rigidly in place against a collar 43 of the bushing which collar 43 maintains the bearing 37 spaced away from the adjacent surface of the stem so as to insure free movement of the lever, and is further provided with a lock nut 44 for locking the nut 42 against rotation.

The outer race member of the bearing 37 is pressed into rigid engagement with the lever 36 and to prevent dirt from entering the bearing through the space between the inner and outer race members, a plate 45 which covers this space is secured to the lever by means of rivets or any other desired securing means. The outer cover plate 45 is provided with a central opening of a diameter sufficient to insure against any frictional engagement between the plate and the collar of the securing nut 42 and the inner cover plate is provided with a similar opening to insure against any frictional engagement between the plate and the collar 43 of the bushing 39.

The lever 36 is contained in chamber 18 and is provided with oppositely disposed arms 46 and 47 which are adapted to control the operation of an exhaust valve mechanism and a supply valve mechanism, respectively.

The exhaust valve mechanism comprises a plunger 48, a pilot exhaust valve 49 and a main exhaust valve 50. The plunger 48 at one end is slidably guided in a bushing 51 mounted in the casing. This end of the plunger is provided with a central bore 52 which is open to the chamber 18 through a passage 53 for the purpose of preventing a dash-pot action when the plunger is moved. Contained in the bore is a spring 54 which operatively engages the plunger and bushing 50 which, as will hereinafter more fully appear, exerts a light counterbalancing pressure on the piston assembly. The plunger, adjacent its other end, is slidably guided in a bushing 55 mounted in the casing. Intermediate the bushings 51 and 55 and as indicated by the reference character 56, the plunger is reduced in diameter to form spaced shoulders 57 and 58 which are adapted to be operatively engaged by oppositely disposed convex surfaces 59 and 60, respectively, on the end portion of the arm 46 of the controlling lever, said end portion of the lever being forked to accommodate the portion 56 of the plunger. The plunger is provided with a collar 61 which is located above the bushing 55 and beyond the collar is provided with a screw-threaded portion 62.

The main exhaust valve 50 is provided with a stem 63 which is in axial alignment with the plunger 48 and which is provided with radially spaced guide lugs 64 which slidably engage the inner surface of a bushing 65 mounted in the casing, said bushing being provided at one end with a valve seat 66 for the exhaust valve. The valve stem is integrally connected to a piston 67 which is slidably mounted in the bushing 65, and this piston is provided with a small port 68 which constantly connects a chamber 69 at one side of the piston to a chamber 70 at the opposite side thereof which is constantly open to the atmosphere through passages 71 in the bushing 65, a chamber 72 and a passage 73 in a cap 74 of the casing. The main exhaust valve is provided with a valve seat 75 on which, as will hereinafter be more fully described, the pilot exhaust valve 49 is adapted to seat and is provided with an axial bore 76 which extends from the valve seat 75 through the valve stem 63 to the outer face of the piston 67.

The pilot exhaust valve 49 is in axial alignment with the plunger 48 and main exhaust valve 50 and is provided with a circular head 77, and adjacent the head, is provided with a smaller square portion 78. The head portion is attached, in abutting relation, to the screw-threaded end portion 62 of the plunger by means of a hooded nut 79, as shown in Fig. 1, said nut being held against accidental turning by means of a pin 80 which passes through the nut and plunger and which at each end is peened over the nut. The hood portion of the nut is provided with a square opening to accommodate the square portion 78 of the pilot exhaust valve.

The valve 49 is provided with a stem 81 which passes longitudinally through the bore 76 in the main exhaust valve and which, at its end, is provided with a stop nut 82 and a locking nut 83 for locking the stop nut against accidental turning. The stop nut is tightened down in close engagement with a circular collar 84 which is preferably integral with the valve stem 81 and is adapted to engage spaced semi-circular bosses 85 extending outwardly from the face of the piston 67, the spaces between the ends of the bosses insuring an open communication between the piston chamber 69 and the bore 76 in the main exhaust valve 50 and valve stem 63 when the stop nut is in engagement with the bosses. It will here be noted that the diameter of the bore 76 is increased for a short distance inwardly from the face of the piston 67 so as to provide for the flow of fluid past the collar 84 which is substantially the same diameter as that portion of the bore which is of small diameter.

The pilot exhaust valve is movable relative to the main exhaust valve 50 and since, as shown in Fig. 1, the valve stem is of less diameter than the greater portion of the bore 76, the stem is provided adjacent each end with spaced guide lugs 86 which slidably engage the main exhaust valve within the bore 76 to maintain the pilot exhaust valve centralized with relation to the main exhaust valve.

It will be understood from the foregoing description of the exhaust valve assembly, that when the pilot exhaust valve is open, as shown in Fig. 1, there will be an open communication from the piston chamber 69 to the pressure chamber 18 by way of the bore 76.

In the manufacture of the relay valve device the plunger 48, pilot exhaust valve 49 and main exhaust valve 50 are secured together as a unit preparatory to being mounted in the casing. In assembling these parts, the plunger 48 and pilot exhaust valve 49 are first connected together by means of the nut 79, then the main exhaust valve is mounted on the stem 81 of the exhaust valve and finally the stop nuts 82 and 83 are turned to the position in which they are shown in Fig. 1. In turning the nut 82 down tight on the collar 84 the nut 79 is adapted to be engaged by the jaws of a wrench to prevent the plunger from being turned, the stem 81 being held from turning by the engagement of the nut with the square portion 78 of the stem.

The supply valve mechanism may comprise a valve piston which in the present embodiment of the invention consists of a piston 87 and a main supply valve 88 having an annular sleeve 89 which has a pressed fit with the piston within an opening provided in the piston. The piston is slidably guided in a bushing 90 which is secured to the casing 10. This bushing is provided with a valve seat 91 which surrounds a passageway 92 leading from a chamber 93 at one side of the valve piston to the pressure chamber 18, said chamber 93 being constantly in open communication by way of openings 94 in the bushing, chamber 95 in the casing and a passage and pipe 96 with a fluid pressure supply source, such as the main reservoir 2. The main supply valve 88 is movable into or out of seating engagement with the valve seat 91 and is therefore adapted to control communication through the passageway 92.

At the other side of the valve piston there is provided a chamber 97 which is connected to the chamber 95 through a passage 98 of small diameter provided in a choke plug 99 having screw-threaded connection with the casing.

Contained in the chamber 97 is a pilot supply valve 100 which is adapted to be moved into and out of engagement with a seat 101 provided on the end of the valve sleeve 89 to control communication through a central bore 102 in the sleeve, which bore leads from the valve seat to a narrow slot 103 provided in the face of the main supply valve, said slot being in constant open communication with the pressure chamber 18.

Also contained in the chamber 97 are control coil springs 104 and 105 which at all times urge the valve piston and pilot supply valve respectively toward their seats. The spring 104 is interposed between and operatively engages the piston 87 and a cap nut 106 which closes an opening in the casing 10 through which the bushing 90, valve piston assembly, pilot supply valve 100 and springs are adapted to be inserted or removed from the casing. The spring 105 is encircled by the spring 104 and is interposed between and operatively engages the cap nut 106 and a spring seat 107 which is preferably integral with the pilot supply valve. The spring seat 107 is of greater diameter than the pilot supply valve 100, but since, as shown in Fig. 1, the greater portion of the spring seat is maintained spaced away from the valve piston the fluid pressure in chamber 97 will act to oppose the opening movement of the pilot supply valve only over an area equal to the area within the seated portion of the valve, thus rendering the valve easily movable to its open position.

The pilot supply valve 100 is provided with a fluted stem 108 which is slidably guided in the supply valve. When the pilot valve is seated, the stem 108 extends across the slot 103 and projects a short distance beyond the face of the main supply valve and is adapted to be operatively engaged by one end of a valve controlling plunger 109 which is axially aligned with the valve piston and pilot supply valve and which is slidably guided in a bushing 110 mounted in the casing. This end of the plunger has a diameter which is greater than the width of the slot 103, so that it will operatively engage the face of the main supply valve after the pilot supply valve has been moved a limited distance in opening direction.

The other end of the plunger 109 operatively engages with a convex surface 111 provided on one side of the arm 47 of the control lever 36. The opposite side of the arm 47 is provided with a convex surface 112 which is adapted to engage with the convex face 113 of a fulcrum member 114 having screw-threaded connection with a bushing 115 mounted in the casing. The fulcrum member 114 is adjustable relative to the casing 10 and is made so for the purpose of varying the positions of the several movable parts of the valve device to compensate for unavoidable inaccuracies in manufacture and to compensate for wear as will hereinafter be more fully described.

The bushing 115 is provided with slots 116 which are spaced apart and which extend inwardly some distance from one end of the bushing to form a lug 117 which is adapted to be slightly sprung inwardly into locking frictional engagement with the screw-threaded portion of the fulcrum member by means of a locking bolt 118 which is located in the pressure chamber 18 and which has screw-threaded connection with the casing 10, thus providing an effective locking means for maintaining the adjustable fulcrum member in any position to which it may be adjusted.

In Fig. 1 of the drawings the relay valve device is shown more or less diagrammatically for the purpose of more clearly illustrating certain features of the invention which could not otherwise be shown without confusing complications, but in Fig. 8 a side elevational view, partly in section, of the relay valve device as actually constructed is shown, and in Fig. 9 a back face view of the valve device is shown, the fluid conducting pipes leading to the pipe bracket being shown in section.

From an inspection of Fig. 8 it will be seen that the rear wall of the casing 10 is provided with a large opening 120 leading to the chamber 18, which opening is adapted to be closed by the pipe bracket 11 when the casing is secured to the bracket as shown in Figs. 8 and 9.

This opening is provided for three purposes, first to permit of the insertion of the control lever 36 into the pressure chamber, second to permit of the insertion of a wrench or other tool for turning the nut 42 on the bolt 38 carried by the piston stem 26, and third to permit of the insertion of a suitable tool for turning the adjustable fulcrum member 114.

The front wall of the casing 10 is provided with an opening 121 through which the bolt 38 is adapted to be inserted in the central bore of the bushing 39 and through which the end of a screw driver or other tool may be passed into engagement with the head 40 of the bolt 38 for holding the bolt against rotation when the nut 42 on the other side of the stem 26 is being tightened. When the lever is secured to the piston stem 26 this opening 121 is closed by means of a plug 122, which has screw-threaded connection with the casing.

The combined brake valve and brake switch device 6 shown diagrammatically in Fig. 1 of the drawings may comprise a rotary valve 123 and a rotary switch 124 which may be simultaneously moved to their several brake controlling positions.

The control valve device 7 may comprise a casing having a piston chamber 125 connected to the brake pipe 5 and contained in this chamber is a piston 126 having a stem 127 adapted to actuate a main slide valve 128 and an auxiliary slide valve 129 contained in a chamber 130 connected through a passage and pipe 131 to the pressure reservoir 3.

The electrically controlled supply valve device 8 may comprise a casing containing the usual winding adapted upon energization and deenergization to control the operation of a valve 132 contained in a valve chamber 133 connected to the pipe 131. Also contained in the chamber 133 is a spring 134 which, at all times, tends to urge the valve 132 toward its seat. The valve is operative to control communication between the valve chamber 133 and a chamber 135 which is connected through a pipe and passage 136 to a passage 137 leading to the seat of the main slide valve of the control valve device 7. One end of the winding of the device 8 is connected by a wire 138 to a switch contact 139 in the combined brake valve and brake switch device 6 and the other end of the winding is connected to ground.

The electrically controlled exhaust valve device 9 may comprise a casing containing the usual winding adapted upon energization and deenergization to control the operation of an exhaust valve 140 contained in a chamber 141 which is constantly open through a passage 142 to the atmosphere. Contained in a chamber 143 which is constantly in open communication with the passage 136 by way of a passage 144, is a spring 145 which, at all times, tends to urge the exhaust valve 140 in a direction away from its seat. One end of the winding of the device 9 is connected by a wire 146 to a switch contact 147 in the combined brake valve and brake switch device 6. The other end of the winding is connected to ground.

For supplying current to the windings of the devices 8 and 9 a battery 148 may be employed. One terminal of the battery is connected to ground and the other terminal is connected to a switch contact 149 in the device 6.

The passage 23 which is connected to the piston chamber 22 of the relay valve device is connected with a pipe 150 which is open to a passage 151 leading to the seat of the main slide valve of the valve device 7.

Operation of the adjusting means

In assembling the several parts of the relay valve device 1, the adjustable fulcrum member 114 is screwed into the bushing 115 a sufficient distance that it cannot possibly interfere with the proper seating of the main and pilot supply valves 88 and 100 respectively. After the supply valves are properly seated and the annular stop rib 159 of the piston 12 is in contact with the cover plate 160 of the casing 10, the adjustable fulcrum member 114 is turned outwardly. As the member is thus turned it causes the arm 47 to move into engagement with the adjacent end of the plunger 109 of the supply valve mechanism, and when in such engagement, the arm 47, due to the continued rotation of the fulcrum member shifts the plunger in a direction toward the pilot supply valve. When there is a slight clearance between the valve engaging end of the plunger and the stem 108 of the pilot supply valve the fulcrum member is no longer rotated and is then secured in its proper position by turning the locking bolt 118 down and thereby forcing the lug 117 into close frictional engagement with the fulcrum member.

When the lever 36 is being moved by the fulcrum member 114 the piston remains in its normal position, so that the lever 36 rocks in a counterclockwise direction about the bolt 38, and as a consequence the plunger 48 and connected exhaust valve parts are moved in the direction toward the piston 12 against the opposing pressure of the spring 54.

If, in repairing the relay valve device it is necessary to regrind the valves to their seats and it is found that due to such regrinding, the valve stem 108 engages the adjacent end of the plunger 109 and the plunger tends to prevent the pilot valve 100 from seating properly, the fulcrum member is turned down until the proper clearance is provided between the valve stem and plunger. When the fulcrum member is being thus adjusted, the lever 36 permits the plunger 48 and pilot exhaust valve 49 to move in the direction toward the pilot exhaust valve seat 75, sufficient clearance being initially provided between the valve 49 and seat 75 that such movement of the valve will not materially affect the rate of flow of fluid from the chamber 18 to the piston chamber 69 in the release movement of the device.

It will thus be seen that by means of the member 114 adjustments in the device may be made to compensate for inaccuracies or wear of the several operating parts.

Charging the equipment

In charging the equipment, fluid under pressure supplied to the main reservoir 2 flows therefrom through pipe and passage 96 to the chamber 95 in the relay valve device, and from this chamber fluid flows through the passages 94 to the main supply valve chamber 93. Fluid also flows from chamber 95 through the restricting passage 98 in the plug 99 to the pilot supply valve chamber 97. The flow of fluid from the chamber 95 to the chamber 93 is at a faster rate than the flow of fluid to the chamber 97 by way of the restricting passage 98, but since, as will hereinafter more fully appear, the pressure of the spring 104 is sufficient to maintain the main supply valve 83 seated against full main reservoir pressure in chamber 93, the communication between the chambers 93 and 18 will not be unintentionally established.

Fluid under pressure supplied to the main reservoir pipe 96 flows therefrom through a feed valve device 152 of the usual construction and a pipe 153 to the combined brake valve and brake switch device 6. With the device 6 in release position as shown in Fig. 1, fluid supplied to the pipe 153 flows by way of a cavity 154 in the rotary valve 123 to the brake pipe 5 and consequently to the piston chamber 125 of the control valve device 7. Fluid under pressure in the chamber 125 insures movement of the piston 126 and associated slide valves 128 and 129 to their normal position as shown in Fig. 1, if they are not already in this position. With the piston thus positioned fluid under pressure flows from the piston chamber 125 by way of a feed groove 155 to the valve chamber 130 and from thence flows through pipe 131 to the pressure reservoir 3 and valve chamber 133 of the magnet valve device 8.

With the control valve device 7 in its normal position as shown in Fig. 1, the control piston chamber 22 of the relay valve device 1 is connected to the atmosphere by way of passage 23, pipe 150, passage 151, a cavity 156 in the main slide valve 128 of the control valve device 7, passage 137, pipe and passage 136, passage 144, spring chamber 143 of the magnet valve device 9, past the unseated valve 140, valve chamber 141 and passage 142.

With the piston chamber 22 of the relay valve device vented, the piston 12 and the several parts associated therewith will be in the position in which they are shown in Fig. 1. In this position the chamber 18 and consequently the brake cylinder 4 are connected to the atmosphere by way of the unseated main exhaust valve 50, chamber 70, passages 71, chamber 72 and passage 73.

*Electric application of the brakes*

When the equipment is thus charged with fluid under pressure and it is desired to effect an application of the brakes by means of the electrically controlled valve devices 8 and 9, the combined brake valve and brake switch device is turned to electric application position. In this position the brake pipe 5 and piston chamber 125 of the control valve device 7 are maintained charged by way of pipe 153 and a cavity 157 in the rotary valve 123, so that the piston 126 of the control valve device and the associated slide valves 128 and 129 will be maintained in their normal position as shown in Fig. 1. Further, in this position a switch contact 158 connects the contacts 147, 139 and 149 thus closing the circuits through the windings of the magnet valve devices 8 and 9 and battery 148, thus energizing said windings. Upon the energization of the winding of the magnet valve device 9, the exhaust valve 140 is caused to seat and close communication from the passage 144 and consequently from the piston chamber 22 of the relay valve device 1 to the atmosphere, and upon energization of the winding of the magnet valve device 8, the supply valve 132 is caused to move out of seating engagement with its seat. The valves 140 and 132 as they are thus moved compress the springs 145 and 134 respectively.

With the valve 132 unseated, fluid under pressure flows from the pressure reservoir 3 to the piston chamber 22 of the relay valve device 1 by way of pipe 131, valve chamber 133 of the magnet valve device 8, past the open valve 132 and its fluted stem, chamber 135, passage and pipe 136, passage 137, cavity 156 in the main slide valve of the control valve device 7, passage 151, pipe 150 and passage 23 in the casing 10 of the relay valve device.

Fluid under pressure thus supplied to the piston chamber 22 causes the relay control piston 12 to move inwardly from the position in which it is shown in Fig. 1. It will here be understood that when the piston 12 is in the position in which it is shown in Fig. 1, the spring 54 is slightly compressed and acts, through the medium of the plunger 48, lever 36, piston stem 26 and fulcrum member 114, to assist the fluid pressure supplied to piston chamber 22 in moving the piston 12 inwardly. This spring also acts to cushion the piston when it is moved from its inner position to its outer position. It will be noted that the piston 12 is provided with an annular stop rib 159 which projects outwardly from the face of the piston and which is adapted to engage the inner surface of a cover plate 160 forming a part of the casing 10 and closing the open end of the chamber 12, and that the cover plate is provided with a groove 161 which, when the stop rib 159 is in contact with the cover plate, establishes a communication from one side of the rib to the other so that fluid under pressure in the chamber 22 acts over the greater portion of the area of the face of the piston. In view of this, and in view of the fact that the spring 54 acts to assist in moving the piston inwardly, the piston will respond quickly to an increase in the pressure of fluid in the chamber.

As the connected pistons 12 and 15 are moved inwardly, the piston stem 26 thereof carries the bolt 38 and central portion of the lever 36 in the same direction, and as the lever is thus moved, the end of the arm 47 thereof fulcrums on the adjacent end of the plunger 109, the force of the spring 105 acting on the plunger 109 through the medium of the pilot supply valve 100 being sufficient to prevent movement of the plunger by the lever until, as will hereinafter more fully appear, the pilot and main exhaust valves 49 and 50, respectively, are seated.

Since the end of the arm 47 of the lever 36 is fulcrumed as just described, the arm 46 is caused to move in the same direction as the pistons and stem 26 are moving, the lever rocking slightly about the bolt 38 and the end of the arm 47 rocking slightly on the end of the plunger 109. The arm 46 as it thus moves forces the plunger 48 in the same direction as the piston stem 26 is moving and first causes the pilot exhaust valve 49 to engage its seat 75 and then through the medium of said valve causes the main exhaust valve 50 to engage its seat 66. As the main exhaust valve is moved toward its seat, the piston 67 which moves with the valve, decreases the volume of the chamber 69 and fluid in this chamber which would be otherwise compressed by the piston 67 is permitted to exhaust through the small passage 68 in the piston, chamber 70, passages 71, chamber 72 and passage 73 to the atmosphere. It will be seen that the venting of fluid from the chamber 69 instead of permitting it to be compressed and thereby resist the closing movement of the main exhaust valve, contributes to the sensitiveness of the relay valve device as a whole.

When the main exhaust valve 50 is seated the shoulder 57 on the plunger 48 acts as a stationary fulcrum for the arm 46 of the lever 36 so that as the pistons 12 and 15 and stem 26 continue to move inwardly the arm 47 is caused to move in the same direction as the piston stem is moving, the lever rocking slightly about the bolt 38 and the end of the arm 46 rocking slightly on the shoulder 57.

The arm 47 as it is thus moved forces the plunger 109 in the same direction as the piston stem 26 is moving and said plunger being in engagement with the fluted stem 108 of the pilot supply valve 100 causes this valve to be unseated against the opposing pressure of the spring 105. Fluid under pressure now flows from chamber 97 to the chamber 18 at a faster rate than fluid is supplied thereto through the restricting passage 98 in the plug 99. This results in a reduction in the pressure of fluid in the chamber 97 and as a consequence the pressure acting on the piston 87 to maintain the valve 88 seated is reduced.

After the pilot valve 100 has been unseated the plunger 109 engages the face of the valve 88 on each side of the slot 103. It will here be understood that the rate of reduction in the pressure of fluid in the chamber 97 by the flow of fluid to the chamber 18 is such that at the time the plunger operatively engages the face of the valve 88 the pressures of the springs 104 and 105 and fluid in chamber 97 slightly exceeds the main reservoir pressure in chamber 93 and acting on that portion of the valve piston which surrounds the valve 88. In view of this only a slight increase in the pressure of fluid in piston chamber 22 over that required to unseat the valve 100 is necessary to cause the valve 88 to be unseated against the opposing reduced seating pressure. This partial unloading of the piston 87 contributes materially to the sensitiveness of the relay valve device as a whole.

Fluid under pressure supplied from the main reservoir to the chamber 93 now flows past the unseated supply valve 88 to the chamber 18 and from thence flows through pipe 21 to the brake cylinder 4, thus effecting an application of the brakes.

Under certain conditions the supply of fluid past the main supply valve 88 to chamber 18 may be at such a rapid rate as to momentarily produce a pressure in chamber 18 which exceeds the actuating or control pressure in the piston chamber 22. It would be undesirable to permit this high pressure to act on the rear face of the piston 12 for the reason that it would tend to cause the piston to move toward its normal or brake releasing position and thereby permit the supply valve 88 to close and to remain closed until such time as the pressure in chamber 18 is reduced, by flow to the brake cylinder, slightly below the actuating pressure in chamber 22, at which time the piston 12 would be caused to again move to unseat the supply valve. In order to prevent this undesired alternate opening and closing of the supply valve 88, and to insure a continuous increase in the pressure in chamber 18 and consequently in brake cylinder 4, the rapid flow of fluid from chamber 18 to the chamber 19 at the rear of the piston is prevented by the restricted flow of fluid past the baffle piston 15. By thus restricting the flow of fluid to chamber 19, the rate of increase in the pressure of this chamber is slightly slower than that of the increase in the actuating pressure in piston chamber 22, so that as long as fluid under pressure is being supplied to the chamber 22, the piston 12 will not be permitted to move forwardly to permit the supply valve 88 to close.

If the combined brake valve and brake switch device 6 is left in application position until such time as the fluid pressure from the pressure reservoir 3 equalizes into the piston chamber 22, a full application of the brakes will be effected. If, however, the device 6 is moved from application position to lap position before such equalization takes place, less than a full application of the brakes will result.

When the combined brake valve and brake switch device 6 is moved from application position to lap position, the circuit through the winding of the magnet valve device 9 is maintained closed, so that the exhaust valve 149 remains closed, and the circuit through the winding of the magnet valve device is opened and the winding deenergized, so that the spring 134 acts to seat the supply valve 132, thus closing off the flow of fluid from the pressure reservoir 3 to the piston chamber 22.

When the pressure of fluid in the chamber 19 of the relay valve device becomes substantially equal to the pressure of fluid in the piston chamber 22, the spring 104 and fluid under pressure in chamber 97 act to seat the main supply valve 88 of the valve piston 87, after which the spring 105 acts to seat the pilot supply valve 100. The supply valves as they are thus moved to their seats, shift the plunger 109 and thereby the arm 47 of the lever 36 in the same direction. Since the arm 46 of the lever is fulcrumed on the plunger 48 this movement of the arm 47 causes the piston assembly to move outwardly, i. e., toward the position in which it is shown in Fig. 1.

The seating of the supply valves 88 and 100 closes off the supply of fluid under pressure to the chamber 18, so that the piston assembly comes to a stop before or just as the arm 47 of the lever engages the fulcrum member 114 and the lever 36 still maintains the exhaust valves 49 and 50 seated.

If for any reason the frictional resistance of the several movable parts of the device should be great enough to prevent fluid under pressure in chamber 97 and the springs 104 and 105 from moving the piston assembly and associated parts to lap position in the manner just described, the piston assembly will nevertheless be moved to lap position when the combined pressures of the springs, fluid under pressure in chamber 97 and the fluid under pressure in chamber 19 at the back of the piston 12 is sufficient to overcome such resistance.

If less than a full application of the brakes has been effected and it is desired to increase the brake cylinder pressure, the combined brake valve and brake switch device 6 is again moved to application position causing the supply valve 132 to open and supply fluid under pressure to the piston chamber 22 of the relay valve device. This causes the piston assembly and supply valves to be operated to again control the supply of fluid under pressure to the chamber 18 and brake cylinder 4.

*Electric release of the brakes*

When it is desired to release the brakes, the combined brake valve and brake switch device is moved to release position in which the windings of the magnet valve devices 8 and 9 are deenergized. Upon deenergization of the winding of the device 8, the spring 134 acts to seat the supply valve 132, and upon deenergization of the winding of the device 9, the spring 145 acts to unseat the exhaust valve 140.

With the exhaust valve unseated, fluid under pressure is vented from piston chamber 22 to the atmosphere by way of passage 23, pipe 150, passage 151, cavity 156 in the main slide valve of the control valve device 7, passage 137, pipe and passage 136, passage 144, chamber 143 in the magnet valve device 9, past the exhaust valve 140, valve chamber 141 and passage 142.

Assuming that the several parts of the relay valve device are in lap position when fluid under pressure is vented from the piston chamber 22, fluid under pressure in chamber 19 acting on the rear face of the piston 12 causes this piston together with the baffle piston 15, piston stem 26, bolt 38 and the central portion of the lever to move outwardly to the position in which this piston assembly is shown in Fig. 1.

At substantially the same time as the piston assembly starts to move from lap position toward release position, the end of the arm 47 of the lever 36 fulcrums on the fulcrum member 114 and thereafter the continued movement of the piston stem 26 outwardly causes the arm 46 of the lever and thereby the plunger 48 to move in the direction of the piston 12, the plunger compressing the spring 54. The plunger in its movement first moves the pilot exhaust valve 49 from its seat against the opposing seating pressure of the fluid in chamber 18 and then through the medium of the valve stem 81 and stop nut 82 moves the main exhaust valve 50 out of engagement with its seat.

It will here be noted that when the pilot exhaust valve 49 is unseated, fluid under pressure flows from the chamber 18 to the piston chamber 69 by way of the bore 76 in the piston stem and the spaces between the semi-circular bosses 85 on the face of the piston 67. The volume of the chamber 69 is small and the flow of fluid thereto is at a fairly rapid rate so that the pressure of fluid in chamber 18 quickly equalizes into the chamber 69, the flow area of the passage 68 in the piston being so small that the flow of fluid therethrough from the chamber to the atmosphere will not materially interfere with such equalization.

Fluid under pressure admitted to the chamber 69 acts through the medium of the piston 67 to substantially unload the main exhaust valve 50 so that substantially only the frictional resistance of the piston 67 and the power of the spring 54 need be overcome by the piston assembly to unseat the valve.

With the main exhaust valve unseated, fluid under pressure flows from the chamber 18 and connected brake cylinder to the atmosphere by way of the open valve, chamber 70, passage 71, chamber 72 and passage 73, thus releasing the brakes.

If when the brakes are applied and the several parts of the relay valve device are in their lap position, the pressure of fluid in chamber 18 is reduced by leakage, the piston 12 will respond to such reduction to unseat the pilot supply valve 100 and thereby permit fluid at main reservoir pressure to flow from the chamber 97 to the chamber 18 to compensate for such leakage. Thus any desired brake cylinder pressure is maintained against leakage.

*Pneumatic application of the brakes*

If, for any reason, the electrical controlling equipment is rendered ineffective, to control the supply and release of fluid under pressure to and from the piston chamber 22 of the relay valve device, the brake valve 123 may be moved to control such supply and release of fluid under pressure.

If it is desired to control an application of the brakes pneumatically, the valve 123 is moved to pneumatic application position in which the brake pipe 5 is connected through a cavity 165 to a pipe 166 leading to the atmosphere and as a consequence of this a reduction in brake pipe pressure is effected.

The reduction in brake pipe pressure also causes a corresponding reduction to be effected in the piston chamber 125 of the control valve device 7, so that fluid under pressure in valve chamber 130 causes the piston 126 to move from the position in which it is shown in Fig. 1 to its outermost position, first shifting the auxiliary slide valve 129 to uncover a supply port 167 in the main slide valve 128 and then shifting the main slide valve to bring the port 167 in registration with the passage 151. Fluid under pressure now flows from the pressure reservoir 3 to the piston chamber 22 of the relay valve device by way of pipe and passage 131, port 167, passage 151, pipe 150 and passage 23. Fluid under pressure thus supplied to the chamber 22 causes the several parts of the relay valve device to function, in the same manner as hereinbefore described in connection with the electrical control, to control the supply of fluid under pressure to the brake cylinder 4.

If before a full application of the brakes is effected the valve 123 is moved to lap position, the brake pipe communication to the atmosphere is lapped and therefore the reduction in brake pipe pressure is stopped. Now when the pressure of the chamber is reduced, by flow of fluid therefrom to the chamber 22, slightly below brake pipe pressure, the preponderance of brake pipe pressure in piston chamber 125 causes the piston 126 to move rearwardly shifting the auxiliary slide valve 129 relative to the main slide valve 128 far enough to lap the port 167 to close off the flow of fluid from the valve chamber 130 to the piston chamber 22. No further reduction in the pressure of fluid in the valve chamber 130 takes place, so that the movement of the piston and slide valve ceases before the main slide valve is moved. With the flow of fluid thus closed off to the chamber 22, the several parts of the relay valve device move to lap position in the same manner as hereinbefore described.

*Pneumatic release of the brakes*

When it is desired to release the brakes, the valve 123 is moved to release position in which fluid under pressure is again supplied to the brake pipe and consequently to the piston chamber 125 of the control valve device 7. Fluid under pressure in this chamber causes the piston 126 and associated slide valves 128 and 129 to move to their innermost position, in which the feed groove 155 is opened by the piston and in which the cavity 156 in the main slide valve 128 establishes the atmospheric communication from the piston chamber 22.

Fluid under pressure is now vented from the chamber 22 to the atmosphere through this communication and as a result the relay valve device functions, as hereinbefore described, to release fluid under pressure from the brake cylinder to effect a release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a valve device for fluid pressure apparatus, the combination with a casing having a pressure chamber from which fluid under pressure is adapted to be supplied to and released for controlling fluid pressure operated apparatus, of an exhaust valve normally establishing an exhaust communication from said chamber, a source of fluid under pressure from which fluid is adapted to be supplied to said chamber, a supply valve assembly normally closing communication from said source to said pressure chamber and having at one side a control chamber supplied with fluid under pressure from said source and having at the other side a supply chamber which is supplied with fluid under pressure from said source, said supply valve assembly comprising a main valve for controlling communication from said supply chamber and thereby from said source to said pressure chamber and a pilot valve for controlling a venting communication from said control chamber, means operable to first actuate the exhaust valve to close said exhaust communication, and then actuate said pilot valve to vent fluid under pressure from the control chamber to reduce the seating pressure on the main supply valve and to finally actuate the main supply valve to admit fluid under pressure from said supply chamber and source to the pressure chamber.

2. In a valve device for fluid pressure apparatus, the combination with a casing having a pressure chamber from which fluid under pressure is adapted to be supplied to and released for controlling fluid pressure operated apparatus, of an exhaust valve normally establishing an exhaust communication from said chamber, a source of fluid under pressure from which fluid is adapted to be supplied to said chamber, a supply valve assembly normally closing communication from said source to said pressure chamber and having at one side a control chamber supplied with fluid under pressure from said source and having at the other side a supply chamber which is supplied with fluid under pressure from said source, said supply valve assembly comprising a main valve for controlling communication from said supply chamber and thereby from said source to said pressure chamber and a pilot valve for controlling a venting communication from said control chamber, means operable to first actuate the exhaust valve to close said exhaust communication and then actuate said pilot valve to vent fluid under pressure from the control chamber at such a rate relative to the rate of supply of fluid under pressure to the control chamber as to reduce the seating pressure on the main valve and to finally actuate the main supply valve to admit fluid under pressure from said supply chamber and source to said pressure chamber.

3. In a valve device for fluid pressure apparatus, the combination with a casing having a pressure chamber from which fluid under pressure is adapted to be supplied to and released for controlling fluid pressure operated apparatus, of an exhaust valve normally establishing an exhaust communication from said chamber, a source of fluid under pressure from which fluid is adapted to be supplied to said chamber, a supply valve assembly normally closing communication from said source to said pressure chamber and having at one side a control chamber supplied with fluid under pressure from said source through a flow restricting passage and having at the other side a piston chamber supplied with fluid under pressure from said source through a passage having a relatively large flow area, said supply valve assembly comprising a main valve for controlling communication from said piston chamber to said pressure chamber and a pilot valve for controlling a venting communication from said control chamber, said venting communication having a greater flow area than that of said flow restricting passage, means operable to first actuate the exhaust valve to close said exhaust communication, and then actuate said pilot valve to vent fluid under pressure from the control chamber to reduce the seating pressure on the main supply valve and to finally actuate the main supply valve to admit fluid under pressure from said source to the pressure chamber, said means being operable when it is desired to release fluid under pressure from the pressure chamber to first permit the supply valve assembly to operate to close the supply communication and to then actuate said exhaust valve to open said exhaust communication.

4. In a valve device for fluid pressure apparatus, the combination with a casing having a pressure chamber through which fluid under pressure is adapted to be supplied to and released from a fluid pressure responsive device to be controlled, of an exhaust valve mechanism normally establishing an exhaust communication from said chamber, a source of fluid pressure from which fluid under pressure is adapted to be supplied to said chamber, a supply valve mechanism normally closing communication from said source of fluid under pressure to said chamber, said exhaust valve mechanism comprising a main valve, a piston attached to the main valve and a pilot valve movable relative to the main valve for controlling a communication from said pressure chamber to a control chamber at one side of said piston and said supply valve mechanism comprising a main valve normally subjected in its seating direction to the pressure of fluid from said source and also comprising a normally seated pilot valve, means operable by fluid under pressure for first actuating the pilot exhaust valve to close communication from said pressure chamber to said control chamber then actuating the main exhaust valve to close the exhaust communication, then actuating the pilot supply valve to reduce the fluid pressure acting on the main supply valve and finally actuating the main supply valve to admit fluid under pressure from said source to said chamber.

5. In a valve device for fluid pressure apparatus, the combination with a casing having a pressure chamber through which fluid under pressure is adapted to be supplied to and released from a fluid pressure responsive device to be controlled, of an exhaust valve mechanism normally establishing an exhaust communication from said chamber, a source of fluid pressure from which fluid under pressure is adapted to be supplied to said chamber, a supply valve mechanism normally closing communication from said source of fluid under pressure to said chamber, said exhaust valve mechanism comprising a main valve, a piston attached to the main valve and a pilot valve movable relative to the main valve for controlling a communication from said pressure chamber to a control chamber at one side of said piston and said supply valve mechanism comprising a main valve normally subjected in its seating direction to the pressure of fluid from said source and also comprising a normally seated pilot valve, means operable by fluid under pressure for first actuating the pilot exhaust valve to close communication from said pressure chamber, said control chamber then actuating the main exhaust valve to close the exhaust communication, then actuating the pilot supply valve to reduce the fluid pressure acting on the main supply valve and finally actuating the main supply valve to admit fluid under pressure from said source to said chamber, said means being operable upon the release of fluid therefrom to first permit the main and pilot supply valves to close off the communication from the source of fluid pressure to the pressure chamber, to then actuate the pilot exhaust valve to admit fluid under pressure from the pressure chamber to the control chamber and thereby relieve the main exhaust valve of the load imposed thereon by fluid under pressure in the pressure chamber and finally actuate the unloaded main exhaust valve to establish the exhaust communication from the pressure chamber.

6. In a control valve device for fluid pressure apparatus, the combination with a casing having a chamber through which fluid under pressure is adapted to be supplied to and released from a fluid pressure responsive apparatus to be controlled, of an exhaust valve mechanism normally establishing an exhaust communication through which said chamber is open to the atmosphere and operable to close said exhaust communication, a source of fluid pressure from which fluid under pressure is adapted to be supplied to said chamber, a supply valve mechanism normally closing a supply communication from said source to said chamber and operable to open the supply communication, and pressure responsive mechanism operable by fluid under pressure supplied to one side thereof for actuating said mechanisms to increase the pressure of fluid in said chamber and operable upon the release of fluid under pressure from said side for effecting the operation of said mechanisms to vent fluid under pressure from said chamber, said exhaust valve mechanism being loaded in its exhaust communication closing position by fluid under pressure in said chamber, and means operable by said pressure responsive mechanism upon the release of fluid under pressure from said side of the pressure responsive mechanism for relieving the exhaust valve mechanism of the load imposed thereon by the pressure of fluid in said chamber.

7. In a control valve device for fluid pressure apparatus, the combination with a casing having a chamber through which fluid under pressure is adapted to be supplied to and released from a fluid pressure responsive apparatus to be controlled, of an exhaust valve mechanism normally establishing an exhaust communication through which said chamber is open to the atmosphere and operable to close said exhaust communication, a source of fluid pressure from which fluid under pressure is adapted to be supplied to said chamber, a supply valve mechanism normally closing a supply communication from said source to said chamber, said supply valve mechanism being normally loaded in its supply communication closing direction by fluid under pressure and said exhaust valve mechanism when in its exhaust communication closing position being loaded in its seating direction by fluid under pressure supplied to said chamber, and means operable by fluid under pressure for actuating said exhaust valve mechanism to close the exhaust communication, to then relieve the supply valve mechanism of a portion of the fluid pressure load imposed thereon and to finally actuate the supply valve mechanism to open the supply communication to said chamber, said means being operable upon the release of fluid under pressure supplied thereto to first permit the supply valve mechanism to close the supply communication, to then relieve the exhaust valve mechanism of the fluid pressure load imposed thereon and to finally actuate the unloaded exhaust valve to its exhaust communication opening position.

8. In a control valve device, the combination with a casing having a chamber through which fluid under pressure is adapted to be supplied to and released from a device to be controlled, of an exhaust valve mechanism normally establishing an exhaust communication from said chamber, a source of fluid under pressure, a supply valve mechanism normally closing a supply communication from said source to said chamber, means operable by fluid under pressure supplied to one side thereof for actuating said valve mechanisms to first close the exhaust communication and to then open the supply communication and operable upon the release of fluid under pressure from said side for first effecting the closing of the supply communication and then effecting the opening of the exhaust communication, said exhaust valve mechanism comprising an exhaust valve which when the exhaust valve mechanism is in its exhaust communication closing position is loaded in its exhaust communication closing direction by fluid under pressure in said chamber and comprising means operable when the supply valve mechanism closes the supply communication for relieving the exhaust valve of the load imposed thereon by the fluid pressure in said chamber.

9. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, said valve when in the latter position being loaded in its communication closing direction by fluid under pressure in said chamber, means operable to relieve the valve of the fluid pressure load, and means for first actuating the first mentioned means and for then actuating the valve to the first mentioned position for venting fluid under pressure from said chamber.

10. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, said valve when in the latter position being subjected on one side to the pressure of fluid in said chamber and on the opposite side to fluid at a lesser pressure, means operable to permit the chamber pressure to equalize on said opposite side of the valve and means for first actuating the first mentioned means and for then actuating said valve to vent fluid under pressure from said chamber.

11. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, said valve when in the latter position being subjected on one side to the pressure of fluid in said chamber and on the opposite side to fluid at a lesser pressure, means operable to permit the chamber pressure to equalize on said opposite side of the valve and means for first actuating the first mentioned means and for then actuating said valve through the medium of the first mentioned means to vent fluid under pressure from said chamber.

12. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, said valve when in the latter position being loaded in its communication closing direction by fluid under pressure in said chamber, a pilot valve operable to admit fluid under pressure from said chamber to the other side of the exhaust valve to relieve the exhaust valve of the load imposed thereon by the fluid under pressure in said chamber, and means for first actuating said pilot valve and for then actuating the exhaust valve to vent fluid under pressure from said chamber.

13. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, said valve when in the latter position being loaded in its communication closing direction by fluid under pressure in said chamber, a pilot valve operable to admit fluid under pressure from said chamber to the other side of the exhaust valve to relieve the exhaust valve of the load imposed thereon by the fluid under pressure in said chamber, means for first actuating said pilot valve and for then actuating the exhaust valve to vent fluid under pressure from said chamber, and means for venting fluid from said other side of said piston.

14. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, a piston carried by said valve and having its face exposed to a piston chamber at atmospheric pressure when the valve is in its communication closing position, said valve when in its communication closing position being loaded in its communication closing direction by fluid under pressure in said pressure chamber, means operable to admit fluid under pressure from said pressure chamber to said piston chamber to thereby relieve the valve of the load imposed thereon by the fluid under pressure in said pressure chamber, and means for actuating the first mentioned means and for then actuating said valve to vent fluid under pressure from the pressure chamber.

15. In a valve device for fluid pressure apparatus, the combination with a casing having a pressure chamber to which fluid under pressure is adapted to be supplied and from which fluid under pressure is adapted to be vented, an exhaust valve having one position for establishing a communication through which fluid under pressure is adapted to be vented from said chamber and having another position for closing said communication, a piston carried by said valve and having its face exposed to a piston chamber at atmospheric pressure when the valve is in its communication closing position, said valve when in its communication closing position being loaded in its communication closing direction by fluid under pressure in said pressure chamber, means operable to admit fluid under pressure from said pressure chamber to said piston chamber to thereby relieve the valve of the load imposed thereon by the fluid under pressure in said pressure chamber, means for actuating the first mentioned means and for then actuating said valve to vent fluid under pressure from the pressure chamber, and means for venting fluid under pressure from the piston chamber to the atmosphere.

16. In a control valve device for fluid pressure apparatus, the combination with a casing having a chamber through which fluid under pressure is adapted to be supplied to and released from a fluid pressure responsive apparatus to be controlled, of an exhaust valve mechanism normally establishing an exhaust communication through which said chamber is open to the atmosphere and operable to close said exhaust communication, a source of fluid pressure from which fluid under pressure is adapted to be supplied to said chamber, a supply valve mechanism normally closing a supply communication from said source to said chamber and operable to open the supply communication, piston means movable by fluid under pressure, a lever pivotally carried intermediate its ends by said piston means and adjacent its ends being adapted to operatively engage said valve mechanisms and being operative, upon movement of said piston, to first actuate the exhaust valve mechanism to close the exhaust communication and to then actuate the supply valve mechanism to open the supply communication, said supply valve mechanism acting as a fulcrum for said lever until the exhaust communication is closed and said exhaust valve mechanism when closed acting as a fulcrum for the lever during the opening movement of the supply valve mechanism, and means arranged at one side of said lever and in axial alignment with the supply valve mechanism for positioning the lever relative to the supply valve mechanism.

17. In a control valve arrangement for fluid pressure apparatus, the combination with a control valve device comprising a casing having a pressure chamber through which fluid under pressure is adapted to be supplied to and released from a device to be controlled, and having in one of its walls an opening leading from the exterior of the casing to the pressure chamber and also having an open ended piston chamber, a supply valve mechanism mounted in the casing operative to control the supply of fluid under pressure to the pressure chamber, an exhaust valve mechanism mounted in the casing operative to control the release of fluid under pressure from said chamber, a lever operable to control the operation of said valve mechanism, a piston assembly adapted to carry said lever and operative for applying an actuating force to said lever, said piston assembly being inserted in said casing through the open end of the piston chamber, a cover plate secured to the casing after the piston assembly is inserted in the casing to close the open end of the piston chamber, and said lever being inserted in said chamber through said opening, said opening facilitating the mounting of the lever on said piston assembly, and a pipe bracket to which said casing is adapted to be secured, said bracket when the casing is secured thereto closing said opening.

18. In a control valve device for fluid pressure apparatus, the combination with a casing adapted to be secured to a supporting member and having a chamber through which fluid under pressure is adapted to be supplied to and released from a device to be controlled, a supply valve mechanism operative to control the supply of fluid under pressure to said chamber, an exhaust valve mechanism operative to control the release of fluid from said chamber, a piston operatively mounted in said casing and having a piston which is contained in said chamber, and a lever mounted on said stem and operative thereby to control the operation of said valve mechanisms, said casing having an opening which is normally closed by said supporting member and through which the connection between the lever and piston stem is accessible when the casing is removed from the supporting member.

19. In a control valve device for fluid pressure apparatus, the combination with a casing adapted to be secured to a supporting member and having a chamber through which fluid under pressure is adapted to be supplied to and released from a device to be controlled, a supply valve mechanism operative to control the supply of fluid under pressure to said chamber, an exhaust valve mechanism operative to control the release of fluid from said chamber, a piston operatively mounted in said casing and having a piston which is contained in said chamber, a lever mounted on said stem and operative thereby to control the operation of said valve mechanisms, adjustable means interposed between said lever and casing operative to position said lever to provide the proper operating relationship between the lever and valve mechanisms, said casing having an opening which is normally closed by said supporting member and through which the connection between the lever and piston stem and the adjusting means are accessible when the casing is removed from the supporting member.

20. In a relay valve device, in combination, a casing having a chamber, an exhaust valve for controlling the release of fluid under pressure from said chamber, a piston carried by said valve, a pilot valve associated with and having a movement relative to said exhaust valve and operable upon movement relative to said exhaust valve for supplying fluid under pressure to the chamber at one side of said piston to facilitate the movement of said exhaust valve, and means for operating said valves.

21. In a relay valve device, in combination, a casing having a chamber, an exhaust valve for controlling the release of fluid under pressure from said chamber, a piston carried by said valve, a pilot valve associated with and having a movement relative to said exhaust valve and operable upon movement relative to said exhaust valve for supplying fluid under pressure to the chamber at one side of said piston to facilitate the movement of said exhaust valve, a lever for operating said valves, a fulcrum for said lever, and means for operating said lever.

22. In a relay valve device, in combination, a casing having a chamber, an exhaust valve for controlling the release of fluid under pressure from said chamber, a piston carried by said valve, a pilot valve associated with and having a movement relative to said exhaust valve and operable upon movement relative to said exhaust valve for supplying fluid under pressure to the chamber at one side of said piston to facilitate the movement of said exhaust valve, a lever for operating said valves, a fulcrum for said lever fixed to said casing and means connected with said lever between said fulcrum and valves for operating the lever.

23. In a relay valve device, in combination, a casing having a chamber, an exhaust valve for controlling the release of fluid under pressure from said chamber, a piston carried by said valve, a pilot valve associated with and having a movement relative to said exhaust valve and operable upon movement relative to said exhaust valve for supplying fluid under pressure to the chamber at one side of said piston to facilitate the movement of said exhaust valve, a lever having an arm for operating said valve and having another arm adapted to be fulcrumed, a fulcrum for said other arm, and means connected with said lever between said arms for operating the lever.

24. In a relay valve device, in combination, a casing having a chamber, a supply valve operable to supply fluid under pressure to said chamber, an exhaust valve for controlling the release of fluid from said chamber, a pilot valve for controlling the operation of said supply valve, a spring opposing the movement of said pilot valve, a lever for operating said pilot valve and said exhaust valve and movable to first close said exhaust valve with the pilot valve acting as a fulcrum and for then opening said pilot valve against the pressure of said spring, and means for operating said lever.

25. In a relay valve device, in combination, a casing having a chamber, a supply valve operable to supply fluid under pressure to said chamber, an exhaust valve for controlling the release of fluid from said chamber, a pilot valve for controlling the operation of said supply valve, a spring opposing the movement of said pilot valve, a lever for operating said pilot valve and said exhaust valve and movable to first close said exhaust valve with the pilot valve acting as a fulcrum and for then opening said pilot valve against the pressure of said spring, and a movable abutment operated by fluid under pressure for actuating said lever.

26. In a relay valve device, in combination, a casing having a chamber, a supply valve for controlling the supply of fluid under pressure to said chamber, an exhaust valve for releasing fluid under pressure from said chamber, a piston carried by said supply valve, a piston carried by said exhaust valve, a pilot valve operative upon movement relative to said supply valve for varying the fluid pressure on said supply valve piston, a pilot valve operable upon movement relative to said exhaust valve for varying the fluid pressure on said exhaust valve piston, and means for operating said pilot valves.

27. In a relay valve device, in combination, a casing having a chamber, a normally seated supply valve for controlling the supply of fluid under pressure to said chamber, a normally unseated exhaust valve for controlling the release of fluid under pressure from said chamber, a piston carried by said supply valve, a piston carried by said exhaust valve, a pilot valve movable relatively to said supply valve for venting fluid under pressure from said supply valve piston, a pilot valve movable relatively to said exhaust valve for supplying fluid under pressure to said exhaust valve piston, and means for actuating said pilot valves.

28. In a brake controlling valve device, in combination, a casing having a chamber, a supply valve for controlling the supply of fluid under pressure to said chamber, a release valve for controlling the release of fluid under pressure to said chamber, a lever operable in two directions for controlling the operation of said valves, means for actuating said lever from either one of said positions to the other, said lever when actuated in one direction first moving said exhaust valve to close a release communication from the chamber and then moving the supply valve to supply fluid under pressure to the chamber, said supply valve acting as a fulcrum for the lever until the exhaust valve is closed and the exhaust valve when closed acting as a fulcrum for the lever, and a fulcrum member rigidly carried by the casing, said lever when actuated in the other direction permitting the supply valve to close the supply communication to said chamber and then actuating the exhaust valve to release fluid under pressure from said chamber, said fulcrum member being engaged by said lever after the supply valve is closed.

29. In a brake controlling valve device, in combination, a casing having a chamber, a supply valve for controlling the supply of fluid under pressure to said chamber, a release valve for controlling the release of fluid under pressure to said chamber, a lever operable in two directions for controlling the operation of said valves, means for actuating said lever from either one of said positions to the other, said lever when actuated in one direction first moving said exhaust valve to close a release communication from the chamber and then moving the supply valve to supply fluid under pressure to the chamber, said supply valve acting as a fulcrum for the lever until the exhaust valve is closed and the exhaust valve when closed acting as a fulcrum for the lever, a fulcrum member adjustably carried by the casing, and means for locking the fulcrum in its adjusted position, said lever when actuated in the other direction permitting the supply valve to close the supply communication to said chamber and then actuating the exhaust valve to release fluid under pressure from said chamber, said lever engaging said fulcrum after the supply valve is closed and before said exhaust valve is opened.

30. In a brake controlling valve device, in combination, a casing having a chamber, valve mechanisms operative to increase or decrease the pressure of fluid in said chamber, a lever for controlling the operation of said valve mechanisms and an abutment movable in one direction by fluid under pressure supplied to one side thereof for moving said lever for effecting the operation of said valve mechanisms to increase the pressure of fluid in the chamber and movable in the opposite direction upon a reduction in the pressure of fluid on said side for effecting the operation of said valve mechanisms to decrease the pressure of fluid in said chamber, and means cooperating with said lever for exerting a pressure on said movable abutment tending to move the abutment in the first mentioned direction.

31. In a brake controlling valve device, in combination, a casing having a chamber, valve mechanisms operative to increase or decrease the pressure of fluid in said chamber, a lever for controlling the operation of said valve mechanisms and an abutment movable in one direction by fluid under pressure supplied to one side thereof for moving said lever for effecting the operation of said valve mechanisms to increase the pressure of fluid in the chamber and movable in the opposite direction upon a reduction in the pressure of fluid on said side for effecting the operation of said valve mechanisms to decrease the pressure of fluid in said chamber, and spring means cooperating with said lever for exerting a pressure on said movable abutment tending to move the abutment in the first mentioned direction.

32. In a brake controlling valve device, in combination, a casing having a chamber, valve mechanisms operative to increase or decrease the pressure of fluid in said chamber, a lever for controlling the operation of said valve mechanisms and an abutment movable in one direction by fluid under pressure supplied to one side thereof for moving said lever for effecting the operation of said valve mechanisms to increase the pressure of fluid in the chamber and movable in the opposite direction upon a reduction in the pressure of fluid on said side for effecting the operation of said valve mechanisms to decrease the pressure of fluid in said chamber, and means cooperating with said lever for exerting a pressure on said movable abutment tending to move the abutment in the first mentioned direction, said means acting to cushion said abutment in its movement in said opposite direction.

33. In a control valve device for fluid pressure apparatus, a casing having a chamber, a normally open exhaust valve, a normally closed supply valve, a member operative in one direction to first close the exhaust valve and to then open the supply valve to increase the pressure of fluid in said chamber and operative in the opposite direction to first effect the closing of the supply valve and to then open the exhaust valve to decrease the pressure of fluid in said chamber, fluid pressure responsive means for moving said member, and means rigidly carried by said casing and arranged in the path of travel of the member adapted upon movement of the member in said opposite direction to engage and effect the operation of said member to open the exhaust valve after the supply valve has closed.

34. In a control valve device for fluid pressure apparatus, a casing having a chamber, a normally open exhaust valve, a normally closed supply valve, a member operative in one direction to first close the exhaust valve and to then open the supply valve to increase the pressure of fluid in said chamber and operative in the opposite direction to first effect the closing of the supply valve and to then open the exhaust valve to decrease the pressure of fluid in said chamber, fluid pressure responsive means for moving said member, and means rigidly carried by said casing adapted upon movement of the member in said opposite direction to engage and impart a rocking movement to said member after the supply valve is closed to open the exhaust valve.

35. In a control valve device for fluid pressure apparatus, a casing having a chamber, a normally open exhaust valve, a normally closed supply valve, a member operative in one direction to first close the exhaust valve and to then open the supply valve to increase the pressure of fluid in said chamber and operative in the opposite direction to first effect the closing of the supply valve and to then open the exhaust valve to decrease the pressure of fluid in said chamber, fluid pressure responsive means for moving said member, and means carried by said casing adapted upon movement of the member in said opposite direction to effect the operation of said member to open the exhaust valve after the supply valve has closed, said means being adjustable relative to the casing for positioning the member to determine the time at which said exhaust valve will open with relation to the closing of the supply valve.

36. In a control valve device for fluid pressure apparatus, a casing having a chamber, a normally open exhaust valve, a normally closed supply valve, a member operative in one direction to first close the exhaust valve and to then open the supply valve to increase the pressure of fluid in said chamber and operative in the opposite direction to first effect the closing of the supply valve and to then open the exhaust valve to decrease the pressure of fluid in said chamber, fluid pressure responsive means for moving said member, and means carried by said casing adapted upon movement of the member in said opposite direction to effect the operation of said member to open the exhaust valve after the supply valve has closed, said means being adjustable relative to the casing for positioning the member relative to said supply valve.

ELLIS E. HEWITT.